United States Patent [19] [11] Patent Number: 4,761,967
Sumikawa et al. [45] Date of Patent: Aug. 9, 1988

[54] CAR AIR CONDITIONER WITH HEAT STORAGE TANK FOR COOLING ENERGY

[75] Inventors: Seiji Sumikawa; Yoichiro Furuya; Shinji Sutoh, all of Saitama, Japan

[73] Assignee: Diesel Kiki Kabushiki Kaisha, Tokyo, Japan

[21] Appl. No.: 786,894

[22] Filed: Oct. 11, 1985

[30] Foreign Application Priority Data

Oct. 11, 1984 [JP] Japan .................. 59-213022
Oct. 11, 1984 [JP] Japan .................. 59-213023

[51] Int. Cl.⁴ .................. F24D 11/00; B60H 3/00; B61D 27/00
[52] U.S. Cl. .................. 62/201; 62/133; 62/244; 62/430; 165/18; 165/42; 165/43; 165/140
[58] Field of Search .................. 165/18, 42, 43, 140, 165/48 R, 59; 62/430, 435, 438, 99, 201, 133, 238.6, 244

[56] References Cited

U.S. PATENT DOCUMENTS

| 2,193,836 | 3/1940 | Winther | 165/18 |
| 2,193,837 | 3/1940 | Winther et al. | 165/18 |
| 2,193,838 | 3/1940 | Murphy et al. | 165/18 |
| 2,884,768 | 5/1959 | Gould | 62/430 |
| 3,128,608 | 4/1964 | Kleist | 62/430 |
| 3,585,812 | 6/1971 | Parker | 62/430 |
| 4,002,201 | 1/1977 | Donaldson | 165/140 |
| 4,167,965 | 9/1979 | Rogers | 165/140 |
| 4,216,658 | 5/1978 | Baker, III et al. | 62/430 |
| 4,466,480 | 8/1984 | Ito et al. | 165/43 |
| 4,556,171 | 12/1985 | Fukami et al. | 165/43 |

FOREIGN PATENT DOCUMENTS 2044958 4/1971 Fed. Rep. of Germany ........ 165/42
57-1445 11/1982 Japan .

Primary Examiner—Albert W. Davis, Jr.
Assistant Examiner—John K. Ford
Attorney, Agent, or Firm—Flynn, Thiel, Boutell & Tanis

[57] ABSTRACT

An air conditioner for vehicle includes a cooler cooled in a cooling circuit which includes a compressor, a heat exchanger located in the vicinity of the cooler, a thermal storage tank connected with the heat exchanger via a heat transfer passage, a pump provided in said heat transfer passage, a first temperature sensor for detecting the temperature TO in close proximity to of the cooler, a second temperature sensor for detecting the temperature TC of the storage tank, and a third sensor for detecting the temperature TR in the car interior, and a heat transfer type partition wall can be integrally provided between a cooling flowing passage of the cooler and a fluid passage of the heat exchanger. The air conditioner for the vehicle serves to cause said pump to be operated to permit cooling energy to be stored when TC is greater then TO and TR is lower than a set value, and to cause said pump to be operated to permit said cooling energy to be radiated when TR is higher than the set value. Cooling energy can be effectively transferred to the heat exchanger via the heat transfer type partition wall. When the temperature in a car is raised to that higher than a set value, the heat stored in storage tank can be radiated to lower the temperature in the car interior.

8 Claims, 4 Drawing Sheets

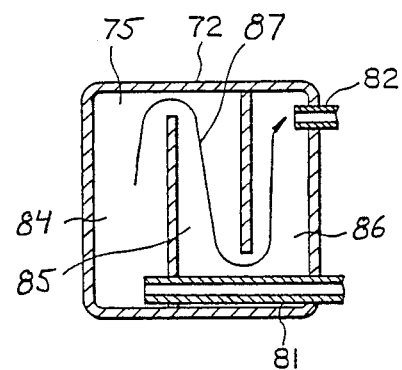

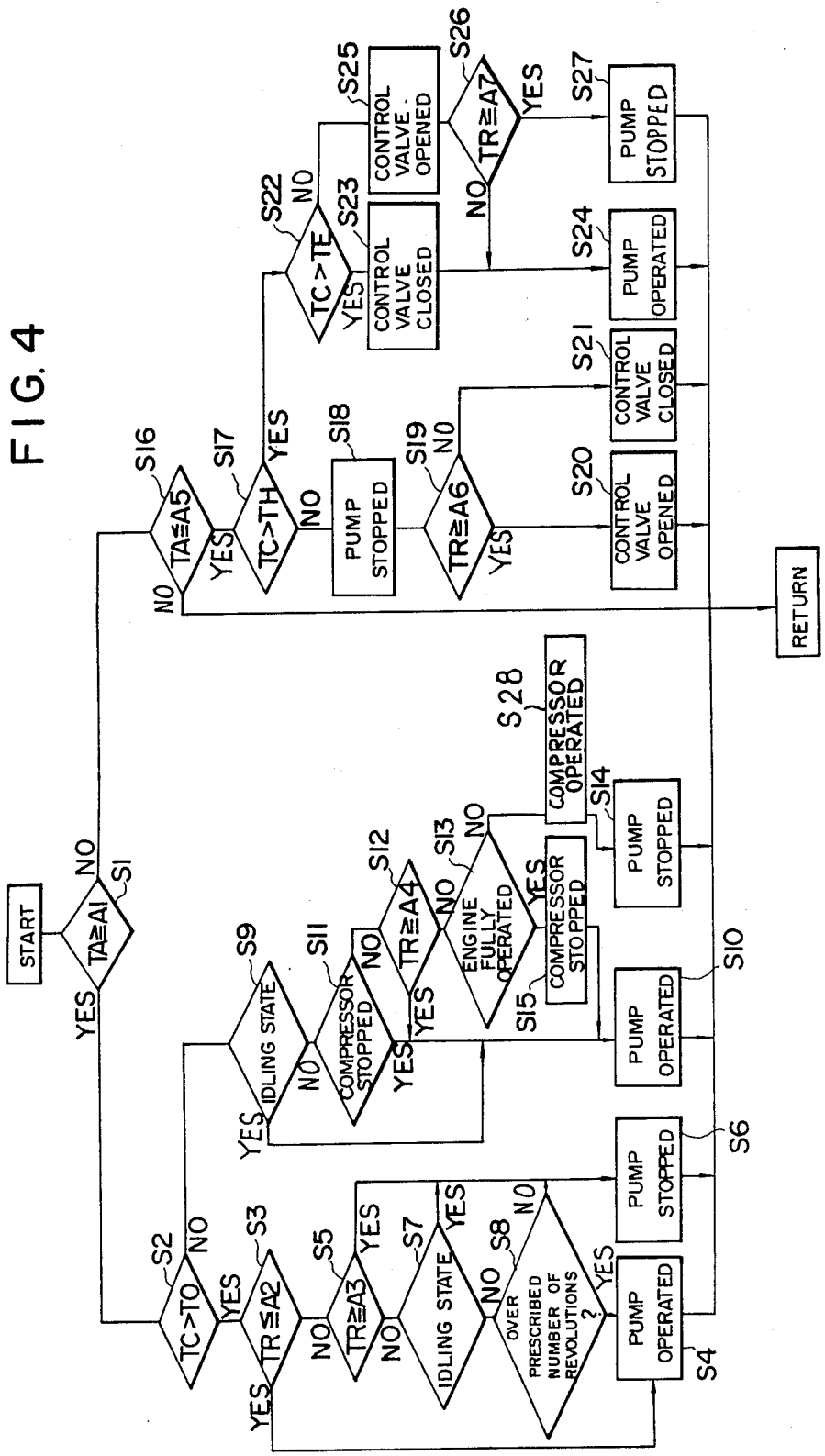

CAR AIR CONDITIONER WITH HEAT STORAGE TANK FOR COOLING ENERGY

BACKGROUND OF THE INVENTION

1. Field of the invention:

The present invention relates to an air conditioner for a vehicle provided with a cooler cooled in a cooling circuit which includes a compressor, and control method therefor. More particularly, it relates to an air conditioner for a vehicle adapted to air-cool the interior of a car by additional capability of the cooler when the temperature inside the car room is above a set value, and a control method therefor.

2. Description of the Prior Art:

There is generally provided an air conditioner for a vehicle such as a car to keep the temperature inside the car comfortable.

A prior air conditioner for a vehicle is provided with a cooler air-cooled in a cooling circuit which includes a compressor, and adapted to supply air cooled by the cooler into the vehicle interior. Power for the compressor is provided from the vehicle engine via a magnetic clutch which is turned on and off by an output signal issued from a temperature sensor provided for measuring the temperature of the cooler.

In the prior vehicle air conditioner for vehicle thus constructed, the temperature of the cooler is measured by the temperature sensor which in turn causes the magnetic clutch to be turned on when the measured temperature is over a set temperature to thereby the compressor to be driven for supplying cooling air into the car. Thereafter, when the measured temperature becomes less than the set temperature, the magnetic clutch is turned off, and thereby operation of the compressor is stopped.

Hereupon, particularly in midsummer, temperature in a car interior is initially lowered to a temperature less than the set one by operation of the compressor, but provided that the operation of the compressor is stopped, the temperature in the car room is immediately raised due the temperature outside the car, causing successive operation of the compressor to be readily effected. Consequently, the compressor repeatedly starts and stops at frequent intervals. In addition, a load is imposed on the engine due the operation of the compressor. The compressor must be accordingly stopped when necessitated by engine operating conditions. This results in the drawback that is impossible to cool the interior of the car during the stoppage of the compressor.

There has been in Japanese Laid-Open Patent Publication No. 57-1445 an approach to resolve such a problem of of a prior air conditioner for vehicle. The apparatus according to this disclosure serves to stop a compressor, and reduce the load on the engine, when the number of engine revolutions is less than a prescribed value while cooling the interior of the car. Namely, the apparatus stores cooling heat from a cooler in a brine solution and then radiates the stored heat when the number of engine revolutions becomes less than a prescribed value.

However, the above-described apparatus suffers from as a drawback that the cooling heat from the cooler is not effectively transferred into the brine solution and thus is not stored therein. In addition, it has as a drawback that radiation of the stored cooling heat is dependent only on the number of engine revolutions, and is independent of the temperature in the car interior. Accordingly, there may be a case according to circumstances in which the above-described cooling heat is further radiated although the temperature in the car interior has been lowered to a set value, and thus the interior of the car is excessively cooled.

SUMMARY OF THE INVENTION

In view of the drawbacks with the conventional air conditioner, it is an object of the present invention to provide an air conditioner for a vehicle which is capable of effectively transferring heat from a cooler and storing it, and a control method for an air conditioner serving to prevent the interior of the car from being excessively cooled.

To achieve the above objects, an air conditioner for a vehicle according to the present invention has a cooler cooled in a cooling circuit which includes a compressor, a heat exchanger located near the cooler, a heat storage tank connected with the heat exchanger via a heat transfer passage, a pump provided on the heat transfer passage, a first temperature sensor for sensing the temperature TO neat the cooler, a second temperature sensor for sensing the temperature TC in the heat sensor tank, a third temperature sensor for sensing the temperature TR in the car interior, and heat transfer type partition walls through which a cooling passage of the cooler and a fluid passage of the heat exchanger are integrally formed, wherein the pump is operated for storing heat when TC is greater than TO and when TR is lower than a set value, while the pump is likewise operated for radiating the stored heat when TR is higher than the set value.

According to the present invention, cooling heat stored in the heat storage tank can be radiated when the temperature in the car interior becomes higher than the set value, and thereby the temperature in the car interior can be lowered.

In addition, according to the present invention, cooling heat from the cooler can be effectively transferred to the heat exchanger via heat transfer type partition walls.

The above and other objects, features and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 3(C) is a cross sectional view taken along the line IIIC—IIIC in FIG. 3(A); and FIG. 4 is a flow chart for illustrating operation of the inventive air conditioner for a vehicle.

DESCRIPTION OF THE PREFERRED EMBODIMENT

The air conditioner according to the present invention will be described below with reference to FIGS. 1, 2, 3 and 4.

Figure 1:
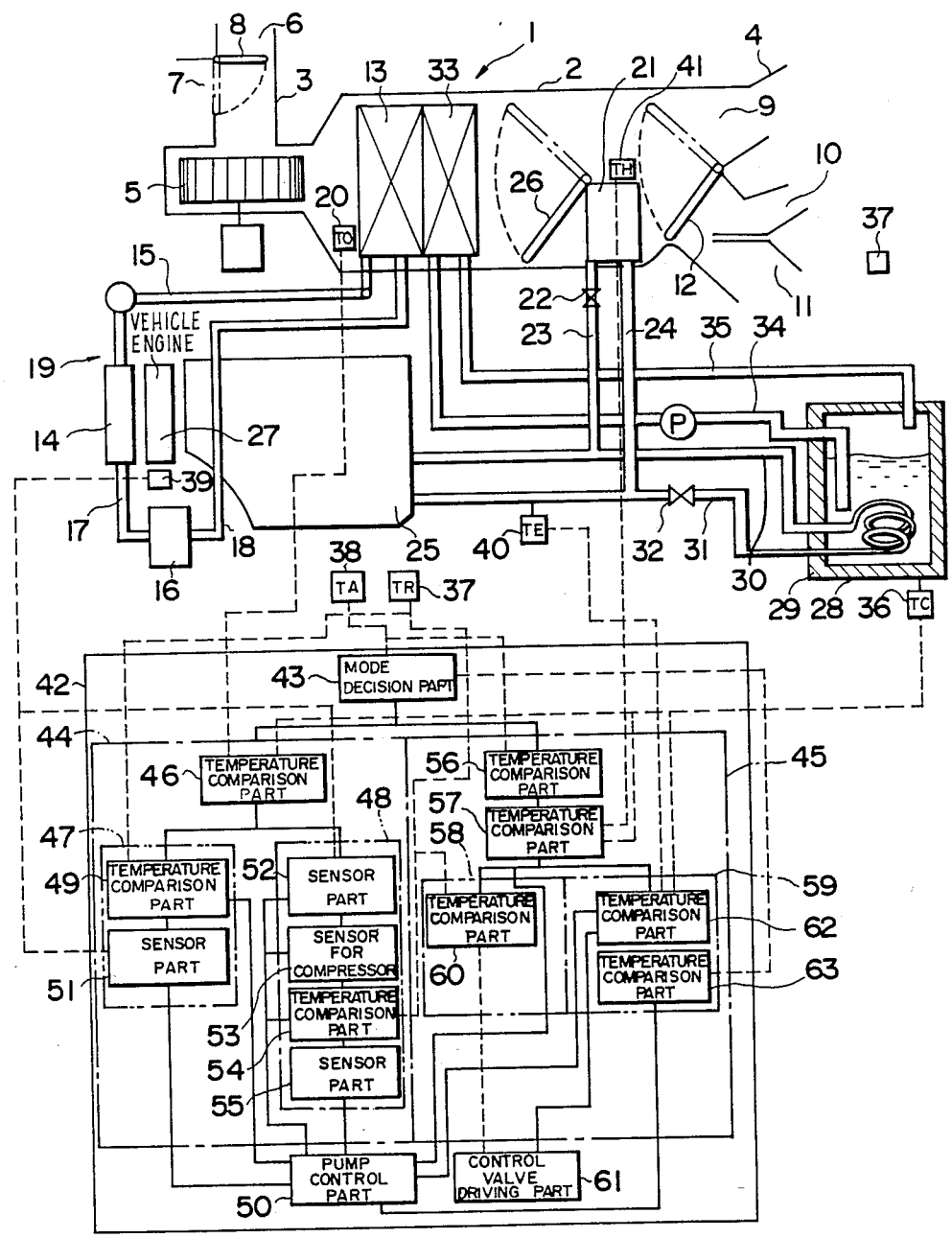
FIG. 1 is a block diagram illustrating an air conditioner for a vehicle embodying the present invention.
Figure 2:
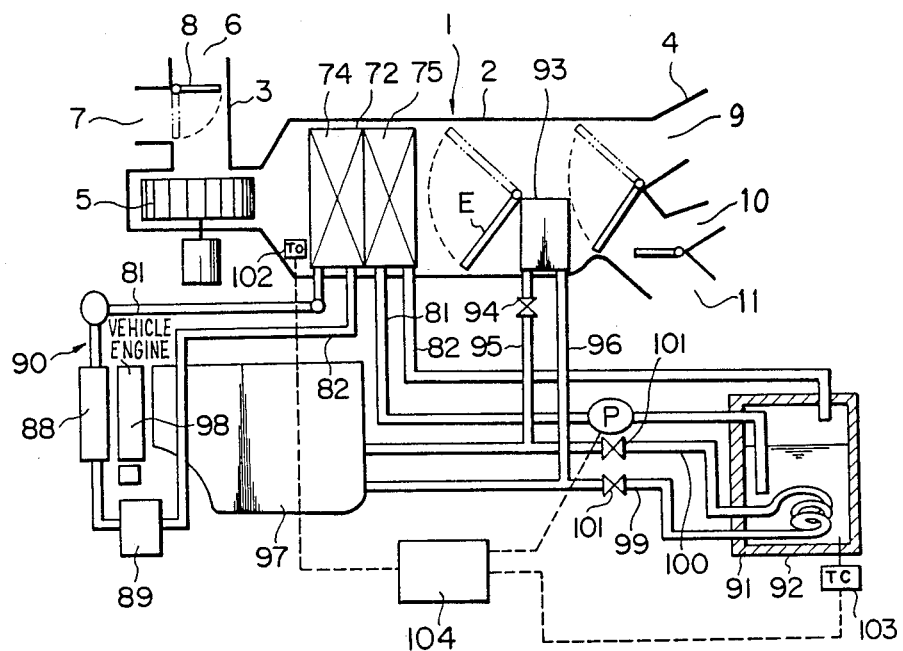
FIG. 2 is a block diagram further illustrating an alternative embodiment of the air condition of FIG. 1, in which heat transfer partition walls are integrally interposed between a cooling flow passage of a cooler and a fluid passage of a heat exchanger.

In FIGS. 1 and 2, designated at 1 is a ventilating duct composed of a cavity part 2, an air intake part 3 located downstream of the cavity part and provided perpendicular to the cavity part 2, and an air blowoff part 4 located downstream of the cavity part 2. A fan 5 is disposed between the air inlet part 3 and the cavity part 2. Consequently, with the fan 5 driven for rotation, air is taken in from the intake part 3, and allowed to pass through the cavity part 2, and thereafter blown off from the air blowoff part 4.

The air intake part 3 is constituted by an outside air intake port 6 and an inside air intake port 7, in which outside or inside air is taken in, depending on the pivotal position of a changeover door 8. The air blowoff part 4 is constituted by a face part blowoff outlet 9 which opens upward, a defrost blowoff outlet 10 which opens in a direction of a car window, and a foor part blowoff outlet 11 which opens downward, in which air is blown off from the face part blowoff outlet 9 or from the foot part blowoff outlet 11 and defrost blowoff outlet 10 in dependence on the pivotal position of a mode changeover door 12.

Designated at 13 is a cooler disposed in the cavity part 2 of the venting duct 1, 14 is a condenser connected with the cooler 13 via piping 14, and 16 is a compressor connected with the condensor 14 and the cooler 13 via pipings 17, 18. The cooler 13, condenser 14 and compressor 16 constitute a cooling circuit 19 which is operated in summer. Accordingly, air taken in from the air intake part 3 is cooled by the cooler 13 during its passage through the cavity part 2. It should be noted here that the compressor 16 is operated and stopped by commands from a control means described later, based on an output from a first temperature sensor 20 for sensing the temperature TO around the cooler 13. Designated at 21 is a heater core provided downstream of the cooler 13, and connected with a radiator 25 via pipings 23, 24, the piping 23 including a control valve 22 interposed in the middle thereof. Cooling water is allowed to flow through the pipings, and thereby the heater core 21 is heated. Consequently, air taken in from the air inlet 3 is heated in the heater core 21. The heater core 21 is operated in winter. Designated at 26 is an air mix door provided upstream of the heater core 21, which is rotated about a horizontal axis so as to move generally vertically in FIG. 1. When the mix door 26 is positioned as shown by a solid line in FIG. 1, air is not brought into contact with the heater core 21 and is thus not heated, while when it is positioned as shown by a one-dot line, air is heated by the heater core 21. Accordingly, the temperature of the air can be increased or decreased by adjusting the position of the air mix door 26. Designated at 27 is an engine.

Likewise, designated at 28 is a thermal storage tank filled with a fluid having a large thermal capacity, and surrounded by a thermal insulating material 29. Tips of branch tubes 30, 31 of the pipings 23, 24 connected with the heater core 21 are positioned in wound states within the storage tank 28, and heat capacity from cooling water in the radiator 25 can be stored in the storage tank 28. The branch tubes 30, 31 are closed and opened by turning on and off a control valve 32 provided in the middle thereof.

Designated at 33 is a heat exchanger disposed downstream of the cooler 13, and communicating with the inside of the storage tank 28 via pipings 34, 35 which serve as a heat transfer passage and include a pump P interposed in the middle thereof. Here, the heat exchanger 33 is in contact with the cooler 13 and thus ready for cooling. Accordingly, when the pump P is actuated during operation of the cooler 13 or in a cooling mode, the fluid contained in the storage tank 28 is sucked up and cooled in the heat exchanger 13, and thereafter recovered again in the storage tank 28, thus allowing cooling energy from the cooler 13 to be stored in the thermal storage tank 28. By contrast, when the aforesaid control valve 32 is turned on and the pump P is actuated during operation of the heating core 21 or in a heater mode, the fluid contained in the storage tank 28 is sucked up, and a quantity of heat stored by the fluid is radiated at the time of its passage through the heat exchanger 33. The pump P is actuated employing a battery as a driving source. In addition, designated at 6 is a second temperature sensor for measuring the temperature TC of the inside on the storage tank 28.

Designated at 37 is a third sensor for measuring the temperature TR in a car interior, and 38 is an outside air temperature sensor for measuring the outside air temperature TA. Desiganted at 39 is an engine sensor for detecting an idling state and a full-open state of an engine 27, as well as the number of revolutions per minute of the engine 27. Further, designated at 40 is a temperature sensor for sensing temperature the TE of the cooling water, and 41 is a temperature sensor for sensing the temperature TH of the heater core 21.

Designated at 42 is a control means which includes a microcomputer and so on, which and is functionally constructed as described below.

First, designated at 43 is a mode decision part, which decides between a cooling mode or a heating mode by comparing the outside air temperature TA with a set value (e.g., 25° C.), and thereby forces one of a later stage cooling means 44 or a heater means 45 to be selectively operated for cooling or heating.

The construction of the cooling means 44 will be first described below.

Designated at 46 is a temperature comparison part operated by the mode decision part 43 when the mode decision part 43 selects the cooling mode, which forces one of a later stage energy storage means 47 or a radiating means 48 to be selectively operated by comparing the temperature TC in the storage tank 28 with that TO around the cooler 13. Hereby, cooling energy is stored in the storage tank 28 from the heat exchanger 33 when the temperature TC is above the temperature TO, while the cooling energy stored in the storage tank 28 is radiated via the heat exchanger 33 when the aforesaid temperature TC is below the temperature TO.

Designated at 49 is a temperature comparison part which constitutes a part of the heat storage means 47, and which compares the temperature TR in a car interior with set values (e.g., 24° C. and 27° C.). The temperature comparison part 49 drives a pump control part 50 to store the cooling energy from the cooler 13 in the storage tank 28 and therby actuates the pump P when the temperature TR in the car interior is lower than 24° C. and thus there is no need to cool the inside of the car. In addition, the temperature comparison part 49 controls the pump control part 50 to stop the pump P when the temperature TR in the car is above 27° C. The cooling energy from the cooler 13 is, in this instance, not transferred to the storage tank 28, and thus ventilating air in the ventilating duct 1 is sufficiently cooled by the cooler 13.

Further, designated at 51 is a sensor part for inputting an output from the engine sensor 39 serving to detect an operation state of the engine 27, which is actuated by the temperature comparison part 49 when the car interior temperature TR falls in the range from 24° C. to 27° C. The sensor part 51 controls the pump control part 50 and thereby operates the pump P when the engine is not idling and its number of revolutions is above 1000 in order to store a fraction of the cooling energy of the cooler 13 in the storage tank 28 while keeping the compressor 16 in operation since the engine 27 has power in reserve when the engine is not in an idling stage and further when the number of engine revolutions is above 1000. In this instance, the engine 27 has no power in reserve when the engine 27 is in an idling state or the number of engine revolutions is less than 1000, so that to avoid having the cooler 13 draw energy required to effectively cool the engine 27, the pump control part 50 is controlled to stop the pump P so as inhibit the transfer of cooling energy from the cooler 13 to the heat storage tank 28.

Further, designated at 52 is a sensor part constituting one part of the radiating means 48, which serves to detect an operation state of the engine 27 by inputting an output from the engine sensor 39, and which is actuated when the temperature comparison part 46 detects that the temperature TO near the cooler 13 is higher than the temperature TC inside the storage tank 28. The sensor part 52 controls the pump control part 50 to operate the pump P in view of reducing a load imposed on the engine 27 to drive the compressor 16 when it detects the engine 27 to be in an idling state, and thereby the sensor part 52 causes cooling energy stored in the heat storage tank 28 to be radiated from the heat exchanger 33. Designated at 53 is a sensor for the compressor which is activated when the sensor part 52 detects that the engine 27 is not in an idling state, which serves to detect whether the compressor 16 is operated or stopped, and which controls the pump control part 50 to operate the pump P if the compressor is stopped, and which thereby causes cooling energy from the storage tank 28 to be radiated.

Designated at 54 is a temperature comparison part which is actuated when the compressor sensor 53 detects that the compressor 16 is in operation, which serves to control the pump control part 50 to operate the pump P when the car interior temperature TR is higher than a set value, and which thereby causes cooling energy from the storage tank 28 to be radiated from the heat exchanger 33 for effecting strong cooling together with the cooler 13.

Likewise, designated at 55 is a sensor part actuated when the temperature comparison part 54 detects that the car room temperature TR is less than a set value, which serves to detect by an output from the engine sensor 39 that the engine 27 is fully opened. Accordingly, the sensor part 55 stops the compressor 16 when it is detected that increasing the of a car speed requires reducing a load imposed on the engine 27, while controlling the pump control part 50 to operate the pump P in view of allowing cooling energy in the storage tank 28 to be radiated. In addition, the sensor part 55 controls the pump control part 50 to stop the pump P when detecting that the engine 27 is not fully opened, and causes the compressor 16 to be operated for cooling.

Next, the constitution of the heater means 45 will be described below.

First, designated at 56 is a temperature control part, which serves to cause a later stage temperature comparison part 57 to be actuated when the outside air temperature TA is lower than a set value (e.g., 10° C.).

The temperature comparison part 57 in turn selectively actuates a later stage heat storage means 58 to permit heat to be stored when the temperature TC of the storage tank 28 is lower than that TH around the heater core 21, while it actuates a later stage heating means 59 to radiate heat when the temperature TC of the storage tank 28 is higher than the temperature TH near the heater core 21. In the heat storage means 58, when actuated the pump control part 50 is first controlled by a command from the temperature comparison part 57 to stop the pump P. Hereby, no stored in the heat storage tank 28 is radiated from the exchanger 33.

Designated at 60 is a temperature comparison part driven by the temperature comparison part 57, which serves to open a control valve drive part 61 to turn on the control valve 32 for storing heat from the cooling water of radiator 25 in the storage tank 28 when the car interior temperature TR is higher than a set value and thus it is unnecessary to strongly heat the car interior. In addition, the temperature comparison part 60 turns off the control valve drive part 61 to close the control valve 32 when the car interior temperature TR is lower than the set value and thus it is necessary to strongly heat the car room temperature TR, and prevents heat in the radiator cooling water of radiator 25 from being transferred to the storage tank 28.

Designated at 62 is a temperature comparison part which is one part of the radiating means 59, and which serves to turn off the control valve drive part 61 to close the control valve 32 and simultaneously controls the pump control part 51 to operate the pump P when the temperature TC in the storage tank 28 is higher than the temperature TE of the cooling water. Hereby, stored heat in the storage tank 28 is radiated from the heat exchanger 33. Further, the temperature comparison part 62 turns on the control valve drive part 61 to open the control value 32 and simultaneously activates a later stage temperature comparison part 63 when the temperature TC of the heat storage tank 28 is lower than the temperature TE of the cooling water.

The temperature comparison part 63 controls the pump control part 50 to turn off the pump P and thereby to stop heat radiation from the heat exchanger 33 when the car interior temperature TR is higher than a set value, while it controls the pump control valve 51 to operate the pump P and thereby causes stored in the heat storage tank 28 to be radiated from the heat exchanger 33 when the car interior temperature TR is lower than the set value.

Figure 3A:
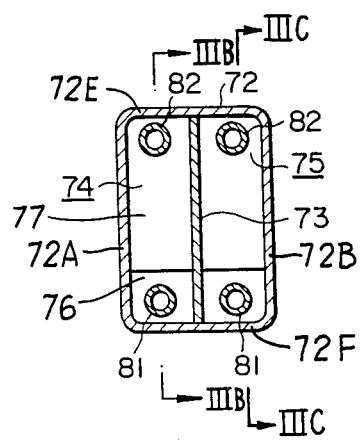
FIG. 3(A) is a longitudinal cross sectional view of a portion of the air conditioner of FIG. 2, taken along the line IIIA—IIIA of FIG. 3(B)
Figure 3B:
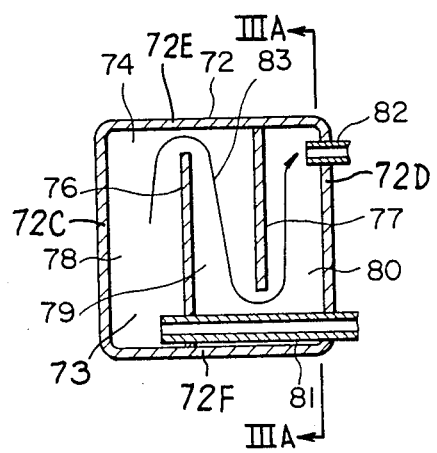
FIG. 3(B) is a cross sectional view of the portion of the air conditioner of FIG. 3(A) taken along a the line IIIB—IIIB in FIG. 3(A)

In FIGS. 2 and 3, designated at 72 is a rectangular parallelpiped casing disposed in the cavity part 2 of the ventilating duct 1, an interior part of which is laterally partitioned into a cooler 74 and a heat exchanger 75 by heat transfer type partition walls 73 as shown in FIG. 3 (a). The inside of the cooler 74 is partitioned into an influent chamber 78, an intermediate chamber 79, and an effluent chamber 80 by a partition wall 76 having an air space provided on the upper side of the cooler and a partition wall 77 having an air space provided on the lower side thereof as shown in FIG. 3(B). An influent piping 81 is in communication with the influent chamber 78, while an effluent piping 82 is in communication with the effluent chamber 80. A cooling passage 83 extending from the influent piping 81 to the effluent piping 82 is thus constituted by the influent chamber 78, the intermediate chamber 79, the effluent chamber 80, and the air gaps. The heat exchanger 75 is constructed similarly to the cooler 74, in which a fluid passage 87 (FIG. 3C) is constituted by an influent chamber 84, an intermediate chamber 85, an effluent chamber 86, and gaps. The influent piping 81 and the effluent pipe 82 of the heat exchanger 75 function as a heat transfer passage. As evident from FIGS. 3(A) and 3(B), the partition wall 73, which as mentioned above divides the casing 72 into the separate chambers 74 and 75, is a solid wall which inherently blocks fluid flow between the chambers 74 and 75. As also mentioned above, the partition wall 73 is a heat transfer type wall, which means that a transfer of thermal energy from the fluid in one of the chambers 74 and 75 to the fluid in the other chamber is effected by the transfer of heat through the wall 73. Similarly, and as also evident from FIGS. 3(A) and 3(B), the walls of the casing 72 are solid and inherently block fluid flow between the interior and exterior of the casing. Consequently, the above-discussed transfers of thermal energy between fluids within the casing 72 and air flowing past the casing 72 through the duct 1 are necessarily effected by transfers of thermal energy through the walls of the casing 72. The influent piping 81 of the cooler 74 is connected with a condenser 88, while the effluent piping 82 is connected with a compressor 89. A cooling circuit 90 is constituted by the cooler 74, influent piping 81, effluent piping 82, condenser 88, and compressor 89. The influent piping 81 and effluent piping 82 of the aforesaid heat exchanger 75 have a pump P interposed in one thereof and both communicate with a thermal storage tank 91.

As evident from FIGS. 3A and 3B, the housing 72 includes spaced parallel and substantially rectangular side walls 72A and 72B, spaced parallel and substantially rectangular end walls 72C and 72D which extend between the side walls 72A and 72B perpendicular thereto, and spaced parallel and substantially rectangular top and bottom walls 72E and 72F which extend between the side walls 72A and 72B and the end walls 72C and 72D perpendicular thereto. The partition wall 73 is parallel to and located intermediate the side walls 72A and 72B, and extends between the end walls 72C and 72D and between the top and bottom walls 72E and 72F. The partition walls 76 and 77 in FIG. 3B each extend between the partition wall 73 and the side wall 72A perpendicular thereto, the partition wall 76 extending upwardly from the bottom wall 72F to a location spaced below the lower surface of the top wall 72E, and the partition wall 77 extending downwardly from the top wall 72E to a location spaced above the bottom wall 72F. In FIG. 3B, the influent piping 81 extends through the lower end portion of the end wall 72D, below the lower end of the partition wall 77, and through the lower end portion of the partition wall 76 to the influent chamber 78.

The storage tank 91 is filled with a fluid having a large heat capacity and is surrounded by an insulating material 92. Accordingly, operation of the pump P causes the fluid contained in the aforesaid storage tank 91 to be circulated through the influent piping 81, the heat exchanger 75 and the effluent piping 82, so that cooling energy of the cooler 74 is stored in the storage tank 91 via the heat exchanger 75.

In addition, designated at 93 is a heater core provided downstream of the aforesaid cooler 74 and the heat exchanger 75, and connected with a radiator 97 via pipings 95, 96 having a control valve 94 interposed in the middle thereof. Cooling water is allowed to flow through the pipings, and thereby the heater core 93 is heated. Consequently, air taken in from the air intake part is heated through the heater core 93. Designated at E is an air mix door which is provided upstream of the aforesaid heater core 93, and which can be rotated so as to move up and down in FIG. 2. When the air mix door E is positioned as shown by a solid line in the same figure, air is not brought into contact with the heater core 93, and thus is not heated, while when it is positioned as shown by a one-dot line, air is heated by the heater core 93. Air temperature is thus raised and lowered by adjusting a position of the aforesaid air mix door E.

Designated at 98 is an engine.

Tips of branch tubes 99, 100 of the pipings 95, 96 connected with the heater core 93 are positioned in the storage tank 91 in a wound state, and a quantity of heat from the cooling water is in the radiator can be stored in the storage tank 91. The aforesaid branch tubes 99, 100 are opened or closed by turning on or off the control valve 101 provided at the middle thereof.

Designated at 102 is a temperature sensor for measuring the temperature TO of the cooler 78, and 103 is a temperature sensor for measuring the temperature TC of the storage tank 91.

Further, designated at 104 is a control means constituted by a microcomputer and the like, which serves to store cooling energy from the cooler 74 in the storage tank 91 by operating the pump P when the temperature of the cooler is less than a set value, while it serves to radiate cooling energy stored in the storage tank 91 to the heat exchanger 75 by operating the pump P when the car interior temperature is above a set value.

A control method of air air conditioner for the vehicle according to the present invention will be described below with reference to FIG. 4.

First, when the outside tempertature TA is measured by the outside temperature sensor 38 to be a value less than a set value A1 (e.g., 25° C.) (Step S1), the air conditioner changes to a cooling mode, the cooling circuit 19 becomes operatable, and ventilating air flowing through the ventilating duct 1 is cooled by the cooler 13, and thereafter is blown off from the air blowoff part 4 into the car interior.

Next, when, in Step S2, the temperature TC in the storage tank 28 is higher than temperature TO around the cooler 13, and, in Step S3, the inside temperature TR is lower than a set value A2 (e.g., 24° C.), the pump P is driven in Step S4, to circulate the fluid in the heat storage tank 28, and thereby cooling energy from the aforesaid cooler 13 is stored in the storage tank 28 via the heat exchanger.

If, in Step S5, the inside air temperature TR is above a set value A3 (e.g., 27° C.), and thus when it is necessary to strongly cool the inside of the car interior, ventilating air is strongly cooled by stopping the pump P or without storing cooling energy from the cooler 13 in Step S6.

In addition, when, in the Step S5, the inside air temperature TR is lower than the set value A3, in Step S7 the engine 27 is not in an idling stage and, in step S8, the number of revolutions of the engine 27 is higher than a prescribed value (e.g., 1000 revolutions), namely when the engine 27 has surplus capability, the pump P is driven in the Step S4 to circulate the fluid in the storage tank 28. Further, when, in the Step S7, the engine 27 is in an idling state or, in Step S8, the number of revolutions of the engine 27 is less than a prescribed value, the pump P is stopped in the Step S6 to stop the cooling energy storage in view of reducing the load imposed on the engine 27.

By contrast, when, in the aforesaid Step S2, the temperature TC in the storage tank 28 is lower than the temperature TO of the cooler 13, cooling energy radiation from the heat storage tank 28 is made possible.

Cooling energy radiation will be described below.

First, when, in Step S9, the engine 27 is in an idling state, the pump P is operated in Step S10 to radiate stored cooling energy in the storage tank 28, and thereby a load imposed on the engine 27 to drive the compressor 16 can be reduced. In addition, when, in Step 11, the compressor 16 is stopped, the pump P is, instead of the compressor, driven in the Step S10, thereby allowing cooling energy in the storage tank 28 to be radiated.

Further, when, in the Step S11 described above, the compressor 16 is in an operation state, and further, the inside air temperature TR is higher than a set value A4 in Step S12, the pump P is operated in the Step S10 to radiate cooling energy from the storage tank 28 and thus the inside of a car interior is powerfully cooled by both the cooler 13 and the heat exchanger 33.

In addition, when, in the Step S12 described above, the inside air temperature TR is lower than the set value A4, further when cooling is not required, and further, in Step S13, the engine 27 is not in a full open state, the compressor is actuated in step S28, and the pump P is stopped to stop cooling energy radiation from the storage tank 28 in Step 14. Further, when, in the Step S13 described above, the engine 27 is to be accelerated and is fully opened, the compressor 16 is stopped in Step S15 to reduce a load to be imposed to the engine 27, and in lieu of it the pump P is operated in the Step S10, thus allowing cooling energy in the storage tank 28 to be radiated for cooling the inside of a car.

Next, in the Step S1, if the outside air temperature TA is found to be lower than the set value A1, then the air conditioner changes to a heating mode. The heater core 21 enters an operatable state, and air becomes heating in the ventilating duct 1. The heater mode will be described below.

First, it is assumed that, in Step S16, the outside air temperature TA is equal to a set value (e.g., less than 10° C.), and then, in Step S17, that the temperature TC in the storage tank 28 is lower than the temperature TH in the vicinity of the heater core 21.

In this instance, heat for the cooling water in the radiator is stored in the storage tank 25. Operation of the heat storage will be described below.

First, the pump P is stopped in Step S18, and heat radiation from the heat exchanger 33 is made impossible, while when the car room temperature TR is higher than a set value A6, a quantity of heat from the radiator cooling water is stored in the storage tank 28 by opening the control valve 32 in Step S20. Further, when the car interior temperature TR is lower than a set value A6 in the Step S19, accordingly when heating is required, the control valve 32 is closed in Step S21, and thus the inside of a car is strongly heated without storing the heat of the cooling water.

On the contrary, when the temperature in the storage tank 28 is higher than the temperature TH in the vicinity of the heater core 21, the stored heat in the storage tank 28 becomes ready to be radiated from the heat exchanger 33. Operation of radiating heat will be described below.

First, when the temperature TC in the storage tank 28 is higher than temperature TE of the cooling water in Step S22, the control value 32 is closed in Step S23, and thereafter stored in the aforesaid heat storage tank 28 is radiated from the heat exchanger 33 by operating the pump P in Step S24.

Next, when the temperature TE of the cooling water is higher than that of the storage tank 28 in the Step S22, heat from the cooling water is transferred to the storage tank 28 by opening the control valve 32 in Step S25.

Thereafter, when the car interior temperature TR is lower than a set value A7 in Step S26, accordingly when heating is required, stored in the heat storage tank 28 is radiated from the heat exchanger by operating the pump P in Step S24.

By contrast, when the car interior temperature TR is higher than the set value A7 in the Step S26 described above and thus no heating is required, heat radiation is stopped by stopping the pump P in Step S27.

Operation of the partition wall will be described below with reference to FIGS. 2 and 3.

When the temperature of the cooler 74 is lower than a prescribed value, the control means 104 serves to cause cooling heat from the cooler 74 to be stored in the storage tank 91 via the heat exchanger 75 by operating the pump P.

By contrast, when the car interior temperature is higher than a prescribed value, the control means 104 serves to cause stored in the heat storage tank 91 to be radiated from the heat exchanger 75 by operating the pump P. Hereby, ventilating air in the ventilating duct 1 can be effectively cooled by the cooler 74 and the heat exchanger 75.

In this instance, the cooler 74 and the heat exchanger 75 have been integrated via the heat transfer partition wall 73, so that the cooling heat of the cooler 74 is effectively transferred to the heat exchanger 75, thus allowing the cooling heat of the cooler 74 to be effectively stored in the storage tank 91.

According to the present invention as described above, the air conditioner for a vehicle has a cooler cooled in a cooling circuit which includes a compressor, a heat exchanger positioned in close proximity to the cooler, a storage tank connected with a fluid flow passage of the heat exchanger via a fluid passage, a pump provided in the heat transfer passage, a first temperature sensor for detecting the temperature TO in the neighborhood of the cooler, a second temperature sensor for detecting the temperature TC of the storage tank, and a third temperature sensor for detecting the car interior temperature. The air conditioner for vehicle is adapted to store cooling energy of the cooler yielded via the heat exchanger in the storage tank by operating the pump when the TC is greater than TO and TR is lower than a set value and to radiate the heat to the heat exchanger when TR is higher than the set value. Accordingly, excess cooling in a car interior can be prevented. In addition, a cooling fluid passage of the cooler and a fluid flowing passage of the heat exchanger are integrated via a heat transfer type partition wall. Consequently, cooling heat can be effectively transferred to the storage tank and stored therein.

Although certain preferred embodiments have has been shown and described, it should be understood that many changes and modifications may be made therein without departing from the scope of the appended claims.

What is claimed is:

1. An apparatus for controlling the temperature in the interior of a vehicle, comprising an air duct communicating at one end with the interior of the vehicle for supplying air thereto; cooling means for cooling air flowing through said air duct, said cooling means including a cooler disposed in said air duct; a heat exchanger disposed in said air duct adjacent said cooler; a tank having therein a fluid capable of storing thermal energy; first means for selectively transferring thermal energy between said heat exchanger and said tank, said first means including second means for transferring cooling energy from said heat exchanger to said tank when the fluid temperature in said tank is greater than the air temperature in said air duct near said cooler and the temperature of the interior of the vehicle is less than a first predetermined value, and third means for transferring cooling energy from said tank to said heat exchanger when the fluid temperature in said tank is less than the air temperature in said air duct near said cooler and the speed of an engine of the vehicle is less than a predetermined speed; and a housing provided in said air duct and having in an interior thereof a partition wall which divides the interior of said housing into separate first and second portions which respectively serve as said cooler and said heat exchanger, wherein said partition wall is capable of conducting thermal energy and thermal energy passes between said cooler and said heat exchanger through said wall.

2. The apparatus according to claim 1, wherein said housing is a rectangular parallelepiped housing, and wherein said partition wall is an integral part of said rectangular parallelepiped housing.

3. The apparatus according to claim 2, wherein said first portion of said housing which serves as said cooler is partitioned into an influent chamber, an intermediate chamber, and an effluent chamber by a first vertical partition wall having an air space provided above an upper end thereof and a second vertical partition wall having an air space provided below a lower end thereof.

4. The apparatus of claim 1, wherein said first means for selectively transferring thermal energy includes: first temperature sensor means provided in close proximity to said cooler for detecting a temperature in the neighborhood of said cooler, second temperature sensor means provided in close proximity to said tank for detecting a temperature in said tank, third temperature sensor means provided in the interior of said vehicle for detecting an interior temperature, and speed sensor means cooperable with an engine of the vehicle for measuring a speed of the engine; and wherein said second means is responsive to said first, second and third temperature sensor means, and said third means is responsive to said first and second temperature sensor means and said speed sensor means.

5. The apparatus of claim 1, wherein said housing includes spaced parallel and substantially rectangular side walls, spaced parallel and substantially rectangular end walls which extend between the side walls perpendicular thereto, and spaced parallel and substantially rectangular top and bottom walls which extend between the side walls and end walls perpendicular thereto, said partition wall being between and substantially parallel to said side walls and extending between said end walls and between said top and bottom walls.

6. The apparatus of claim 5, wherein said housing has on each side of said first-mentioned partition wall first and second further partition walls which are vertically spaced and which each extend between said first-mentioned partition wall and a respective one of said side walls, each said first further partition wall extending upwardly from said bottom wall to a location spaced below said top wall and each said second further partition wall extending downward from said top wall to a location spaced above said bottom wall, the region between said first and second further partition walls being an intermediate chamber, the region on a side of said first partition wall remote from said intermediate chamber being an influent chamber, and the region on the side of said second further partition walls remote from said intermediate chamber being an effluent chamber.

7. The apparatus of claim 6, wherein said housing includes two influent pipes which each communicate with a respective said influent chamber at a location in the region of said bottom wall, and two effluent pipes which each communicate with a respective said effluent chamber at a location in the region of said top wall.

8. The apparatus according to claim 7, wherein each said effluent chamber is adjacent one of said end walls, wherein each said effluent pipe extends through said one wall adjacent an upper end thereof, and wherein each said influent pipe extends through said one end wall adjacent a lower end thereof, extends below a lower end of a respective one of said second further partition walls, and extends through a lower end of a respective one of first further partition walls.

* * * * *